United States Patent [19]

Akkerman et al.

[11] Patent Number: 4,519,575
[45] Date of Patent: May 28, 1985

[54] VALVES AND VALVE ACTUATORS

[75] Inventors: Neil H. Akkerman; Daniel O. Dewey, both of Houston, Tex.

[73] Assignee: Ava International Corporation, Houston, Tex.

[21] Appl. No.: 602,511

[22] Filed: Apr. 20, 1984

[51] Int. Cl.³ .............................................. F16K 31/00
[52] U.S. Cl. .................... 251/58; 251/1 A; 251/251; 92/52; 92/130 C; 92/130 D
[58] Field of Search .............. 251/63.6, 14, 1 A, 63.4, 251/62, 63.5, 58, 251, 262; 92/130 C, 130 D, 130 R, 52; 74/55

[56] References Cited

U.S. PATENT DOCUMENTS

| 1,711,565 | 5/1929 | Hatfield | 92/52 X |
| 4,077,303 | 3/1978 | Poulsen | 91/50 |
| 4,372,333 | 2/1983 | Goans | 137/1 |

FOREIGN PATENT DOCUMENTS 706845  6/1931  France .............................. 251/251
637952  4/1952  Italy .................................. 251/58

Primary Examiner—Samuel Scott
Assistant Examiner—Allen J. Flanigan
Attorney, Agent, or Firm—Vaden, Eickenroht, Thompson & Jamison

[57] ABSTRACT

There is disclosed a gate valve which is moved to open position by an extendible and retractable, fluid-operated actuator, and which is moved to closed position, upon exhaust of operating fluid, by coil springs which urge follower parts reciprocable with a stem on the gate, and which extend from the valve body into a housing connected on the valve body, into engagement with cam surfaces on the housing. The cam surfaces are so arranged that the coil springs initially move the gate from open toward closed position with a relatively small force, and then move it into fully closed position with a force which is sufficiently larger to shear a wire line or other obstruction in the flowway of the valve body which would otherwise prevent closing of the gate.

15 Claims, 6 Drawing Figures

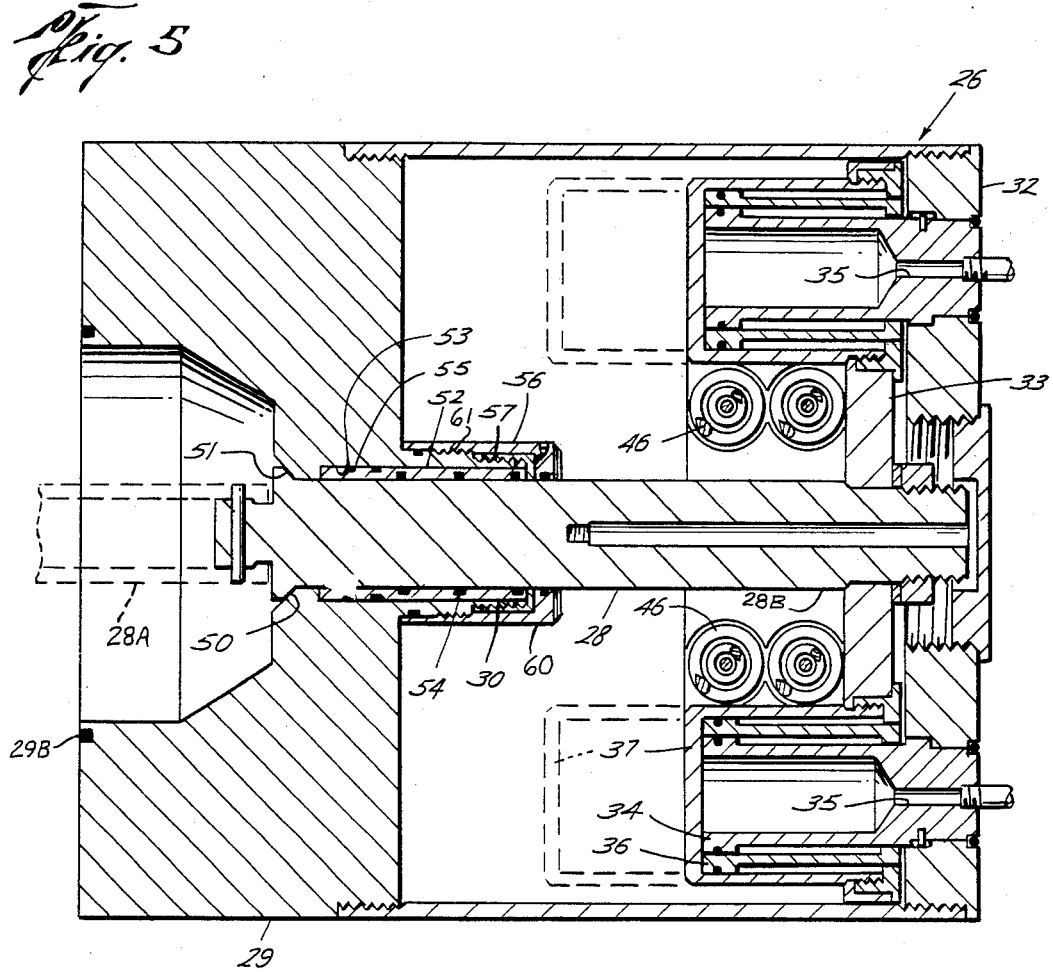
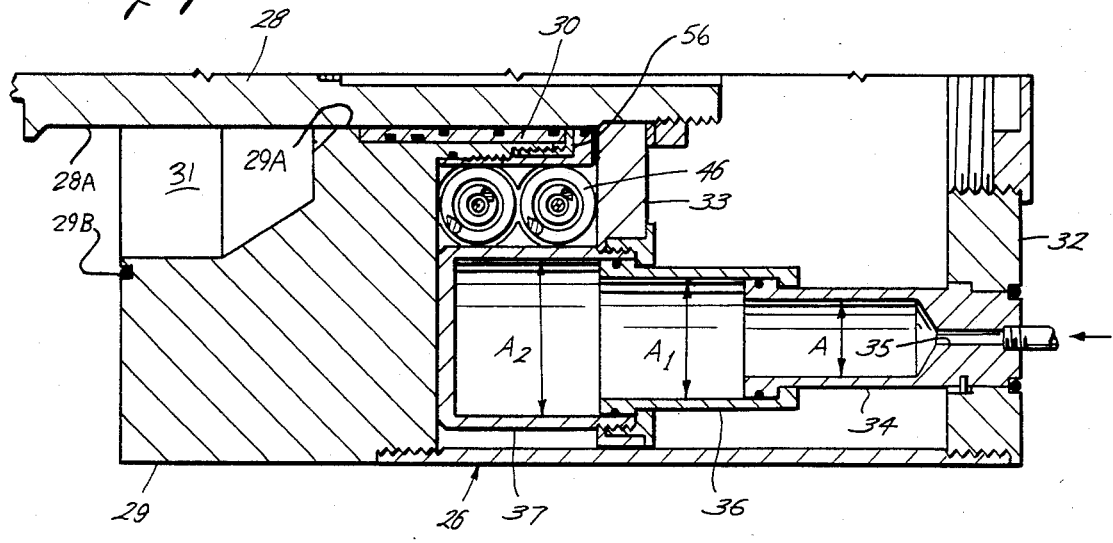

VALVES AND VALVE ACTUATORS

This invention relates to valves and valve actuators of the general type in which a closure member is adapted to be moved to valve opening position in response to the supply of fluid to fluid-operated means connected to a stem on the closure member, and which is automatically moved to valve closing position, upon exhaust of the operating fluid from the fluid operated means, by spring means in which energy is automatically stored as the valve is opened. More particularly, it relates to improvements in valves and valve actuators of this type in which the spring means supplies sufficient energy to the closure member, upon closing of the valve, to sever a wireline or other obstruction in the flowway of the valve body which would otherwise prevent closing of the valve.

Valves of this general type are often used in environments in which the closure member is adapted to "fail closed" in response to a predetermined condition in a fluid system controlled by the valve—e.g., a loss of operating fluid pressure or a loss of fluid pressure to which the operating fluid is responsive. The closure member may be a gate having a through conduit and adapted to be moved to open position by a piston connected to the outer end of a stem on the gate which extends from the valve body and into a cylinder mounted on the body and in which the piston is sealably reciprocable, and to closed position, when operating fluid is exhausted from the cylinder on one side of the piston, by one or more coil springs which are compressed between the other side of the piston and the cylinder.

Since the springs expand as the valve closes, they may not provide sufficient force to sever a wireline or other object which extends within the flowway and through the gate conduit, whereby the valve may not close. Since the force required to sever the wire line may be as great as that required to merely close the gate, the mere use of larger and stronger spring means would require a corresponding large fluid operating means for opening the valve.

Thus, as shown in U.S. Pat. No. 4,372,333, it has been proposed to instead provide a valve of this general type having additional spring means within the cylinder for urging follower means into engagement with cam means formed on an outer end of the stem which extends sealably through the end of the cylinder opposite the valve body, with the cam means being so arranged that the additional spring means moves the closuremember toward the end of its closing movement with a force which is greater than the force with which it is moved during initial closing movement. More particularly, the stem includes a lost motion connection which permits energy to be stored in the additional spring means as the fluid operating means initially moves the outer end of the stem in a direction to open the valve, but prior to closing of the connection to begin movement of the closure member toward open position, and thus when the overall power requirements of the valve are reduced.

However, in this prior valve and actuator, difficulty may be encountered in sealing between the cylinder and the outer end of the stem since the cam means on the rod is tightly engaged by the follower means as the outer end of the stem moves toward and away from the position it occupies just prior to closing of the valve. Also, because of the extension of the outer end of the stem from the cylinder, the valve may not be usable in environments in which headroom is at a premium. Furthermore, the space between the piston and one end of the cylinder requires a large volume of operating fluid to open the valve, and considerably more than would be required when the fluid is hydraulic. Still further, the valve is of complicated construction in that the energy to be stored for severing the wireline or other obstruction requires spring means in addition to the spring means disposed between the piston and cylinder to close the valve.

An object of this invention is to provide a valve and actuator of this latter type in which one or more of these problems is obviated.

Another object is to provide such a valve and actuator in which the cam and follower means are so arranged that energy for severing the wireline may be stored without having to provide an outer extension on the stem which would add to the headroom requirements of the valve.

A more particular object is to provide a valve and actuator of the character above described in which the valve is moved to open position by fluid-operated means which is of such construction as to require considerably less operating fluid, and more particularly also reduces headroom to a minimum.

A still more particular object is to provide such a valve and actuator which are of simplified construction in that a single spring means is so arranged as to both urge the valve closed and provide the force necessary to sever the wire line.

These and other objects are accomplished, in accordance with the illustrated embodiment of the present invention, by a valve and actuator of the type described in which the means for moving the closure member to closed position, upon exhaust of operating fluid from the fluid-operated means, includes follower means reciprocable with the stem and spring means yieldably urging the follower means into engagement with the cam means, and extendible and retractable fluid-operated means extends between the stem and the housing for moving the closure member to open position in response to the supply of operating fluid thereto. More particularly, the cam means is so arranged that the spring means moves the closure member toward the end of its closing movement with a force greater than the force with which it is initially moved toward closed position. Thus, there is no need to seal about an outer extension of the stem with which the follower means is engageable, and the volume of operating fluid may be substantially less than that required by the prior valve and actuator above described.

In accordance with a further novel aspect of the present invention, the fluid-actuated means comprises a cylinder which is mounted on the housing, and piston means reciprocable with respect to the cylinder and mounted on the stem for extension to open the valve and retraction with respect thereto to close the valve, with the end of the stem and piston means being in substantially side-by-side relation with the cylinder, when the piston means is retracted, whereby the housing occupies no more head room than the end of the stem as it moves in a direction away from the valve body. More particularly, and in accordance with the preferred and illustrated embodiment of the invention, the piston means includes an inner piston sealably slidable about the cylinder between extended and retracted positions with respect to the cylinder, during that stage of movement of the closure member in which the follower means is engaged with the cam means, and an outer piston mounted on to the stem and sealably slidable about the inner piston between extended and retracted positions with respect to the inner piston, during the remainder of movement of the closure member. As a result, when the inner and outer pistons are first extended with respect to the cylinder, the operating means has a relatively large area over which operating fluid is effective to store energy in the spring means as the closure member is initially moved toward open position, and when the outer piston is then extended with respect to the inner piston, the operating means has a relatively small area over which operating fluid is effective to continue to move the closure member to open position. Hence, the operating means is programmed to store energy in the spring means in a very efficient manner without a lost motion connection or other complex arrangement.

More particularly, additional cam means is mounted on the housing for engagement by the follower means and is so arranged that the spring means moves the closure member toward closed position with said lesser force during initial closing movement. As a result, a single spring means serves to not only store energy for severing a wire line or the like within the flowway of the valve, during final closing movement, but to also move the valve from open position toward final closed position.

In the illustrated embodiment of the invention, the closure member is a gate, and in particular a gate having a through conduit. As also illustrated, the cam means includes cam surfaces on opposite sides of the stem, the stem includes a flange on its outer end, the means for moving the closure member toward closed position includes a pair of bodies each on one side of the stem and the inner side of the flange, and the follower means comprises follower parts each mounted on the body and urged by coil springs extending between the bodies to maintain each follower parts against the cam surfaces and the bodies against the inner side of the stem flange. More particularly, the stem flange and cam means have longitudinally interfitting parts to maintain the follower parts engaged with the cam surfaces during stem reciprocation.

In the drawings, wherein like reference characters are used throughout to designate like parts: FIG. 1 is a vertical cross-sectional view of a through conduit gate valve and actuator constructed in accordance with the present invention, with the gate in open position and showing a wire line extending through the flowway and conduit through the gate;

Figure 1:
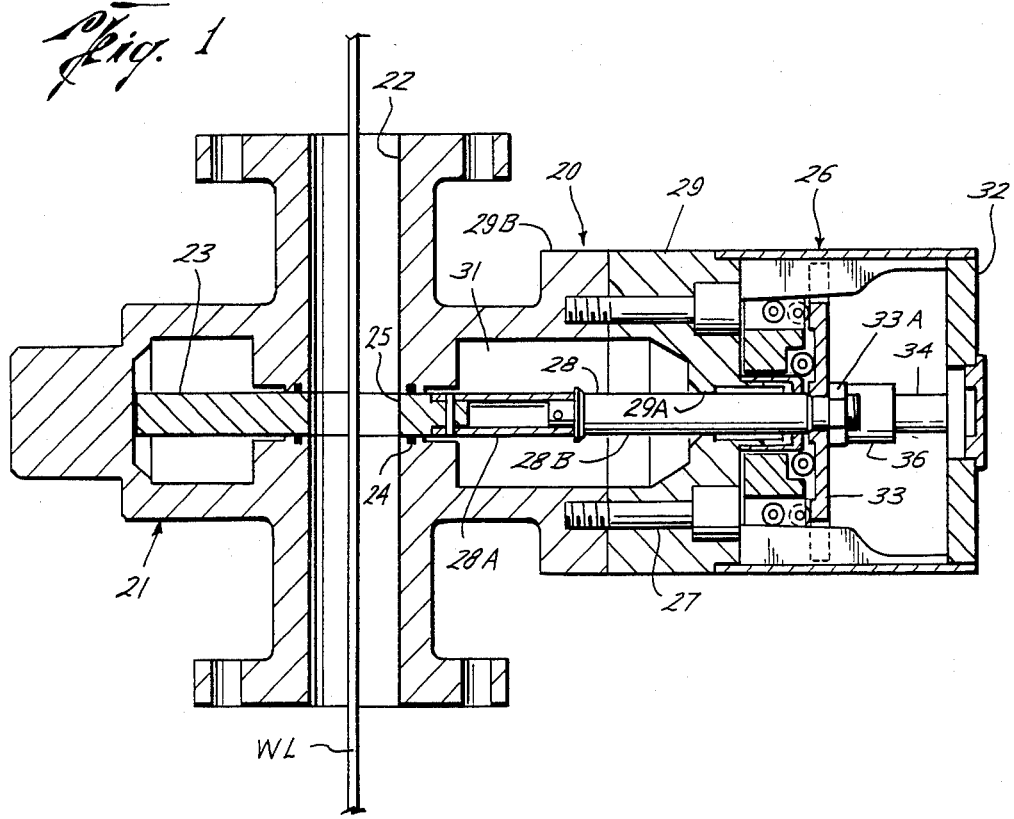
Figure 2:
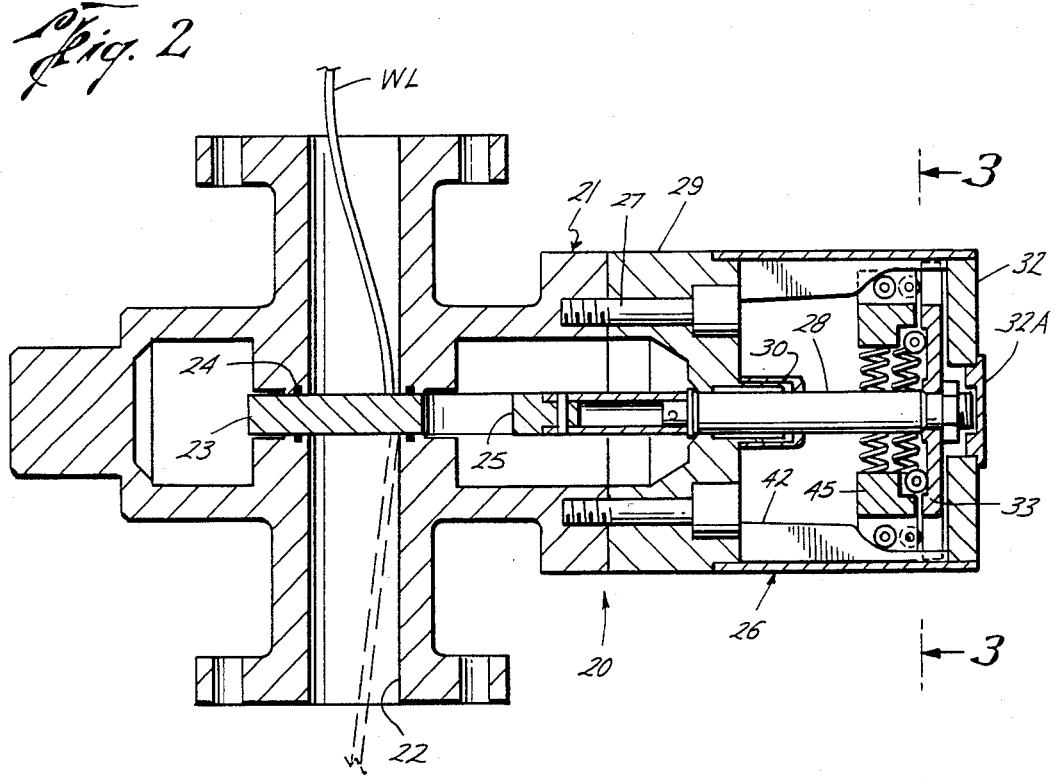
FIG. 2 is a longitudinal sectional view of the valve, similar to FIG. 1, but upon movement of the gate to closed position, to sever the wire line by shearing it between the edges of the through conduit in the gate and the intersection of the flowway with the opening in the valve body in which the gate reciprocates.
Figure 3:
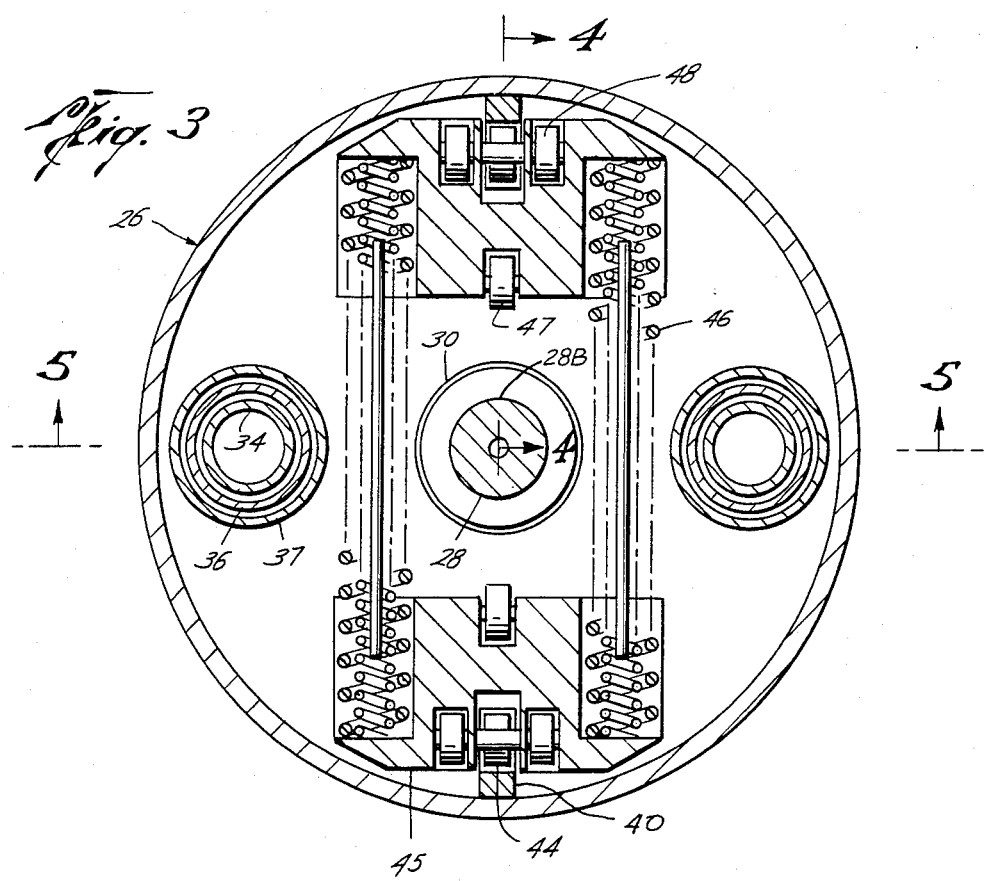
FIG. 3 is a cross-sectional view of the actuator on an enlarged scale, and as seen along broken lines 3—3 of FIG. 2.

FIG. 5 is another longitudinal sectional view of the actuator as seen along broken lines 5—5 of FIG. 3, and showing the inner and outer pistons shown in broken lines in the positions they occupy upon initial opening or final closing movement of the gate; and FIG. 6 is still another longitudinal sectional view of the right side of the actuator, as seen along broken lines 6—6 of FIG. 3, but upon extension of both pistons to move the gate to the open position of FIG. 1;

With reference now to the details of the above-described drawings, the overall valve, which is indicated in its entirety by reference character 20, is shown in each of FIGS. 1 and 2 to include a valve body 21 having a flowway 22 therethrough and a gate 23 mounted within the valve body for reciprocation within an opening 24 in the valve body intersecting the flowway between positions in which a through conduit 25 therein is aligned with the flowway to open the valve (FIG. 1) and out of alignment with the flowway to dispose a solid portion of the gate across the flowway to close the valve (FIG. 2). As shown in each of FIGS. 1 and 2, an obstruction such as a wire line WL may extend through the flowway 22 and conduit 25 in the gate, when the gate is in its open position, and thus in a more conventional valve of this type, prevent the valve from closing as the gate moves toward closed position. This could have especially serious consequences if, for example, the valve is mounted on a wellhead with its flowway 22 forming a continuation of the bore through the wellhead, and intended to close off the bore through the wellhead in the event of a blowout or other emergency condition.

As also shown in each of FIGS. 1 and 2, the valve 20 also includes a cylindrical housing 26 having an inner end wall 29 which is mounted by bolts 27 or the like on one side of the flowway and which has a hole 29A (FIGS. 4, 5 and 6) therethrough to receive an operating stem 28 connected and extending from the gate. Thus, as shown, the end face of the end wall carries a seal ring 29B to sealably engage the end face of a flange on the side of the valve body in surrounding relation to a cavity 31 on one side of the valve through which the stem extends. More particularly, the stem includes an inner portion 28A connected to the gate, and an outer portion 28B connected to the inner portion and extending through a seal assembly 30 mounted in the hole in the inner wall 29 to form a sliding seal about the stem as it is reciprocated to move the gate between opened and closed positions. As shown in each of FIGS. 1 and 2, seal rings are carried within grooves in the opening in which gate 23 is slidable to seal with respect to opposite sides of the gate in its opened and closed positions. Although line fluid may pass between the conduit 25 and the cavity, as the gate moves between these positions, it is contained by the seal assembly 30.

An end wall 32 is removably connected over the outer end of the cylindrical housing 26 to provide an enclosure for the outer end of the stem 28 as the gate moves from the open position of FIG. 1 to the closed position of FIG. 2, in which latter position the outer end of the stem is substantially adjacent the end wall 32. However, as will be understood from the description to follow, the housing need not provide a fluid-tight enclosure, but only protection for the stem as well as the cam and follower means and spring means which are disposed within the housing, as will be hereinafter described. A cap 32A is removably disposed with a central hole through housing end wall 32 to permit access to the interior of the housing and passage of the stem therethrough, should that become necessary.

A flange 33 is connected by a nut 33A to the outer end of the stem 28 for reciprocation with the stem between a lower position when the valve is open, as shown in FIG. 1, and a position adjacent the inner side of the end wall 32 of the housing, when the valve is closed, as shown in FIG. 2. As previously described, the valve is adapted to be moved from the closed position of FIG. 2 to the open position of FIG. 1 by means of an extendible and retractable, fluid operated means between the housing and the stem. More particularly, and as best shown in FIG. 5, this operating means includes a pair of cylinders 34 mounted of the end wall 32 in the housing and extending into the housing on opposite sides of the stem 28, and piston means sealably reciprocable with respect to the cylinder and mounted on the stem flange for moving the stem from the upper position of FIG. 5 to the lower position of FIG. 6 in order to move the gate to open position, upon the supply of operating fluid to the cylinder 34 and thus the piston means through a port 35 extending through the upper end of the cylinder.

More particularly, the piston means includes an inner piston 36 sealably slidable about the cylinder between a retracted position substantially longitudinally coextensive therewith, and thus in side-by-side relation to the outer end of the stem when the stem is raised to the position of FIG. 5 upon closing of the valve, and an extended position as shown in FIG. 6 in which an internal shoulder about its upper end engages an external shoulder about the lower end of the cylinder, as well as an outer piston 37 which is sealably slidable about the inner piston 36 between a retracted position in which, as shown in FIG. 5, it is substantially longitudinally coextensive with the inner piston and the cylinder, and thus in side-by-side relation to the outer end of the stem, in the retracted position of the inner piston, and the extended position as shown in FIG. 6, wherein it has moved the flange on the stem and thus the stem further downwardly to move the gate to the fully opened position of FIG. 1. As fluid is introduced into the cylinder through the port 35, the inner piston is urged upwardly against end wall 32 and the outer piston 37 is extended with respect to the cylinder and the inner piston to the position illustrated in broken lines in FIG. 5. After it reaches its fully extended position with respect to the cylinder, the outer piston 37 will then move the inner piston 36 with it to extended position as the stem continues to be moved downwardly to fully open the valve.

For reasons which will be more significant from the description to follow, the operating means thus not only requires less operating fluid and is therefore particularly well suited to hydraulic operation, but also in moving the stem downwardly, and thus the gate toward open position, initially has a relatively large and then a relatively small pressure responsive area. Thus, as the pistons move to the broken line position shown in FIG. 5, the stem is moved downwardly with a force equal to the pressure of the operating fluid times the area of the inner diameter $A_2$ of the outer piston 37, and then further downwardly from the broken line position of FIG. 5 to the solid line position of FIG. 6 with a force which is equal to the pressure times the area of the inner diameters $A_1$ of the inner piston 36.

Figure 4:
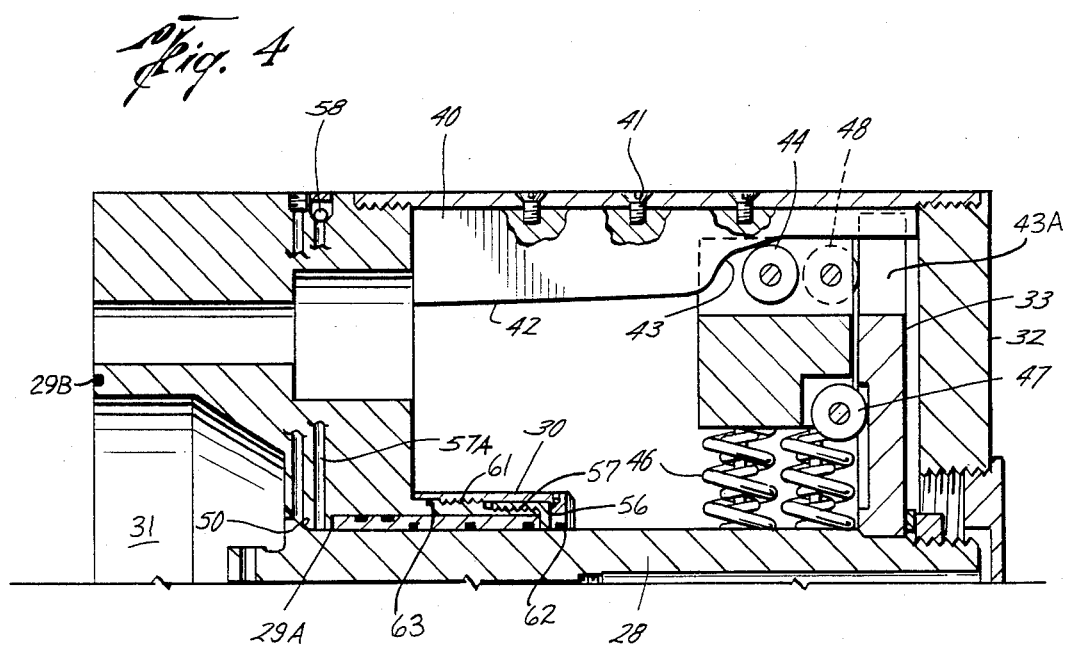
FIG. 4 is a longitudinal sectional view of the left side of the actuator, on an enlarged scale and as seen along broken lines 4—4 of FIG. 3.

As best shown in each of FIGS. 3 and 4, the cam means within the housing comprises plates 40 mounted by rivets 41 or the like to the inner walls of the inner sides of the cylindrical housing 26 of the housing on opposite sides of the stem. More particularly, the inner faces of the plates 40 provide first cam surfaces 42 forming a relatively small angle with respect to the axis of the stem, and second cam surfaces 43 which are continuations of the first cam surfaces, but form a relatively large angle with respect to such axis.

The follower means comprises a pair of rollers 44 each rotatably mounted on a body 45 disposed beneath the flange 33 on the stem and between the stem and the plates for rolling engagement with the first and second cam surfaces 42 and 43 on opposite sides of the stem. As shown, the bodies of slots 43A are formed in opposite sides of the flange 43 for fitting closely over the upper ends of the plates 40, as best shown in FIG. 4.

More particularly, coil springs 46 are compressed between the bodies 45 on opposite sides of the stem to urge the rollers 44 into engagement with the cam surfaces 42 and 43. Thus, upon exhaust of operating fluid from the operating means, and with the valve in the open position of FIGS. 1 and 6, the stem is free to be moved upwardly, and thus to move the gate toward closed position. The inclination of the cam surfaces 42, even though small, will force the bodies 45 and thus the follower parts against the inner side of the stem flange so that the stem is moved upwardly. As shown in each of FIGS. 3 and 4, guide rollers 47 and 48 are also rotatably carried by the bodies 45 for rolling along the lower side of the flange 33 and thus guidably maintaining the body and the springs in a transverse position with respect to the stem as the stem reciprocates in moving the gate between opened and closed positions. As shown in FIG. 4, rollers 47 ride within lateral slots in the flange so as to cooperate with slots 43A to maintain the follower rollers in rolling engagement with the cam surfaces.

As the gate moves upwardly with the stem, the lower edge of the through conduit 25 therein will engage and lift the wire line WL against the upper edge of the intersection of the opposite sides of the flowway with the opening in which the gate is movable. At this stage of opening movement of the gate, the follower rollers have moved upwardly from the cam surfaces 42 and onto the cam surface 43. Since the latter forms a larger angle with respect to the axis of reciprocation of the stem, the stem will be move upwardly by a larger vertical component of the force of the springs 46, and thus with a considerably larger force than that with which they were moved upwardly as the follower rollers moved along the cam surfaces 42, whereby the wire line WL is sheared.

It will be noted in this respect that the lower portion of the cam surfaces 43 which intersects the cam surface 42 form a larger angle with respect to the axis of the stem than the upper portion of surface 43. Thus, the largest possible force is applied to the gate at the instant of shearing the wire line WL following which the gate continues to be moved upwardly to the fully closed position of FIG. 2 with a somewhat lesser force. It will be further noted that although some of the energy of the compressed springs is lost as the gate begins to move toward closed position, and the follower rollers move over the cam surfaces 42, this loss is relatively small in view of the relatively small angle which the surfaces 42 form with respect to the axis of the stem. Consequently it is possible to accomplish the overall purposes of the present invention with only a single spring means.

When it is desired to reopen the valve, operating fluid is admitted to the operating means so as to fully extend the inner and outer pistons from the solid line position of FIG. 5 to the position of FIG. 6. As previously described, during initial opening movement, the outer piston 37 moves to extended position with respect to the inner piston and cylinder 34, as shown in broken lines in FIG. 5, so that operating fluid acts over the relatively large areas $A_2$ when the follower rollers are moving downwardly over cam surfaces 43 so as to further compress and thereby store energy in the springs 46. Then, when the energy has been stored in the spring, the stem may be moved further downwardly to continue to close the valve as the follower rollers move along the relatively steep cam surfaces 42. During this latter time, of course, the springs have been essentially fully compressed or energized so that only a small horizontal component of force is required to compress them sufficiently to permit the continued closing movement of the gate.

As best shown in each of FIGS. 4 and 5, when the gate is in closed position, a conical shoulder 50 about upper stem portion 28B engages a similarly shaped seat 51 at the lower end of the opening 29A through which the upper stem portion extends. Thus, the stem will ordinarily provide a metal-to-metal seal with the housing, so as to close the cavity in the closed position of the gate, as shown in FIG. 2. When the gate is in other than its closed position, or if the metal-to-metal seal in the stem and housing fails, seal assembly 30 provides a sliding seal between the stem and housing so as to prevent fluid leakage from the cavity. As shown, seal assembly 30 includes a bearing sleeve 52 which is received within a counterbore 53 in the upper end of opening 29A and which carries seal rings 54 and 55 on its inner and outer diameters for sealably engaging, respectively, with the upper portion of the stem and the counterbore 53. The sleeve 52 is held in sealing position by a retainer cap 56 which is threadedly connectible at 57 to an upwardly extending neck on the housing wall 29 forming the upper end of the counterbore 53 to dispose an inwardly extending shoulder on its upper end in engagement with the upper end of the sleeve 52.

In the event the seal assembly 30 is rendered ineffective for any reason, such as fire which might destroy the seal rings 54 and 55, it would be dangerous to remove the sleeve to replace the seal rings since the sleeve also acts as a bearing for the stem which, if removed, would permit the stem to wobble and thus break the metal-to-metal seal. Thus, as best shown in each of FIGS. 5 and 6, a further means is provided for maintaining a seal between the upper portion of the stem and the housing.

For this purpose, the outer end wall 32 of the housing may be removed, and the stem flange and follower parts lifted from the stem to permit another cap 60 to be disposed over the cap 56 and threadedly connected at 61 to the outer side of the neck of the inner wall of the housing beneath the lower end of the cap 56. More particularly, the cap 60 carries a seal ring 62 within an opening through its upper end which closely receives the upper portion of the stem so as to seal with it as the stem reciprocates, and its lower inner diameter is slidable over seal ring 63 carried by the neck of the inner wall of the housing beneath the threads 61. As shown, port 57A is formed in the end wall of the housing to connect with opening 29A intermediate seat 50 and seal rings 54, and a ball 58 is carried thereon to vent the port and thereby pressure fluid which leaks past the seal sleeve during assembly of cap 60.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a closure member movable within the body for opening and closing the flowway, a housing on the body having cam means thereon, a stem connected to the closure member and extending from the body and into the housing for longitudinal reciprocation therein, extendible and retractable, fluid-actuated means extending between the stem and housing for moving the closure member to open position in response to the supply of operating fluid thereto, and means for moving the closure member to closed position in response to the exhaust of operating fluid from said fluid-operated means, including follower means reciprocable with the stem, and spring means yieldably urging the follower means into engagement with the cam means, said cam means being so arranged that the spring means moves the closure member during the end of its closing movement with a force greater than the force with which the closure member is initially moved toward closed movement.

2. A valve of the character defined in claim 1, wherein said fluid-operated means comprises cylinder means mounted on the housing and piston means sealably reciprocable with respect to the cylinder means and mounted on the stem for extension with respect to said cylinder means to open the valve and retraction with respect thereto to permit the valve to close, and said piston means and the end of the stem are in substantially side-by-side relation to the said cylinder means when the piston means is retracted to close the valve.

3. A valve of the character defined in claim 2, wherein the piston means includes inner piston means sealably slidable about the cylinder means between extended and retracted positions with respect to the cylinder means, and outer piston means mounted on the stem and sealably slidable about the inner piston means between extended and retracted positions with respect to the inner piston means, whereby, operating fluid is effective over a large area as the outer piston means is first extended with respect to the cylinder means and the inner piston means to store energy in the spring means, and operating fluid is then effective over a relatively small area as the inner and outer piston means are then extended with respect to the cylinder means to continue to move the closure member toward opening position.

4. A valve of the character defined in claim 1, wherein closure member is a gate.

5. A valve of the character defined in claim 4, wherein the gate has a through conduit.

6. A valve of the character defined in claim 2, wherein said means for moving the closure member includes additional cam means on the housing against which the follower means is yieldably urged and so arranged that the spring means initially moves the closure member toward closed position.

7. A valve actuator, comprising a housing adapted to be mounted on a valve body which has a flowway therethrough and a closure member movable within the body to open and close the flowway, said housing having cam means thereon a stem longitudinally reciprocable within the housing and having an inner end extending from the housing for connection to the closure member, when the housing is mounted on the valve body, in order to move the closure member between open and closed positions, extendible and retractable, fluid-operated means extending between the stem and housing for moving the closure member to open position in response to the supply of operating fluid thereto, and means for moving the closure member to closed position in response to the exhaust of operating fluid from said fluid-operated means, including follower means reciprocable with the stem, and spring means yieldably urging the follower means into engagement with the cam means, said cam means being so arranged that the spring means moves the closure member during the end of its closing movement with a force greater than the force with which the closure member is initially moved toward closed movement.

8. A valve actuator of the character defined in claim 7, wherein said fluid-actuated means comprises cylinder means mounted on the housing and piston means sealably reciprocable with respect to the cylinder means and mounted to the stem for extension with respect to said cylinder means to open the valve and retraction with respect thereto to permit the valve to close, and said piston means and the end of the stem are in substantially side-by-side relation with the said cylinder means when the piston means is retracted to close the valve.

9. A valve actuator of the character defined in claim 8, wherein the piston means includes inner piston means sealably slidable about the cylinder means between extended and retracted positions with respect to the cylinder means, and outer piston means mounted on the stem and sealably slidable about the inner piston means between extended and retracted positions with respect to the inner piston means, whereby, operating fluid is effective over a large area as the outer piston means is first extended with respect to the cylinder means and the inner piston means to store energy in the spring means, and operating fluid is then effective over a relatively small area as the inner and outer piston means are then extended with respect to the cylinder means to continue to move the closure member toward opening position.

10. A valve actuator of the character defined in claim 7, wherein said means for moving the closure member includes additional cam means on the housing against which the follower means is yieldably urged and so arranged that the spring means initially moves the closure member toward closed position.

11. A valve actuator of the character defined in claim 7, wherein said cam means includes cam surfaces on opposite sides of the stem, said stem includes a flange on its outer end, said means for moving the closure member toward closed position includes a pair of bodies each on one side of the stem and the inner side of the flange, said follower means comprises follower parts each mounted on a body, and said spring means includes coil springs extending between the bodies to yieldably urge each follower part against a cam surface and each body against the inner side of the stem flange.

12. A valve actuator of the character defined in claim 11, wherein the stem flange and cam means have longitudinally interfitting parts, and said bodies and stem flange also have longitudinally interfitting parts to maintain the follower parts engaged with the cam surfaces during stem reciprocation.

13. A valve actuator of the character defined in claim 11, wherein said means for moving the closure member includes additional cam means on the housing against which the follower means is yieldably urged, said additional cam means including additional cam surfaces forming continuations of the cam surfaces of the first-mentioned cam means and so arranged that the coil springs initially move the closure member toward closed position.

14. A valve, comprising a body having a flowway therethrough, a closure member movable within the body for opening and closing the flowway, a housing on the body, a stem connected to the closure member and extending from the body and into the housing for longitudinal reciprocation therein, extendible and retractable, fluid-actuated means extending between the stem and housing for moving the closure member to open position in response to the supply of operating fluid thereto, and means for moving the closure member to closed position in response to the exhaust of operating fluid from said fluid-operated means, including cam and follower means on the housing and stem, and spring means yieldably urging the follower means into engagement with the cam means, said cam means being so arranged that the spring means moves the closure member during the end of its closing movement with a force greater than the force with which the closure member is initially moved toward closed movement, and said fluid-operated means comprising cylinder means mounted on the housing, inner piston means sealably slidable about the cylinder means between extended and retracted positions with respect to the cylinder means, and outer piston means mounted on the stem and sealably slidable about the inner piston means between extended and retracted positions with respect to the inner piston means, whereby operating fluid is effective over a large area as the outer piston means is first extended with respect to the cylinder means and the inner piston means to store energy in the spring means, and operating fluid is then effective over a relatively small area as the inner and outer piston means are then extended with respect to the cylinder means to continue to move the closure member toward opening position.

15. A valve, comprising a body having a flowway therethrough, a closure member movable within the body for opening and closing the flowway, a housing on the body, a stem connected to the closure member and extending from the body and into the housing for longitudinal reciprocation therein, extendible and retractable, fluid-actuated means extending between the stem and housing for moving the closure member to open position in response to the supply of operating fluid thereto, and means for moving the closure member to closed position in response to the exhaust of operating fluid from said fluid-operated means, said fluid-operated means comprising cylinder means mounted on the housing, inner piston means sealably slidable about the cylinder means between extended and retracted positions with respect to the cylinder means, and outer piston means mounted on the stem and sealably slidable about the inner piston means between extended and retracted positions with respect to the inner piston means, whereby operating fluid is effective over a large area as the outer piston means is first extended with respect to the cylinder means and the inner piston means, and operating fluid is then effective over a relatively small area as the inner and outer piston means are then extended with respect to the cylinder means to continue to move the closure member toward opening position.

* * * * *

UNITED STATES PATENT AND TRADEMARK OFFICE
CERTIFICATE OF CORRECTION

PATENT NO. : 4,519,575
DATED : May 28, 1985
INVENTOR(S) : Neil H. Akkerman and Daniel O. Dewey It is certified that error appears in the above-identified patent and that said Letters Patent are hereby corrected as shown below:

Column 8, Claim 1, lines 19 and 20 change "movement" to --position--.

Column 9, Claim 7, line 23 change "movement" to --position--.

Signed and Sealed this

Fourth Day of November, 1986

[SEAL]

Attest:

DONALD J. QUIGG

Attesting Officer

Commissioner of Patents and Trademarks